United States Patent [19]

Pak et al.

[11] Patent Number: 4,562,480

[45] Date of Patent: Dec. 31, 1985

[54] MOUNTING APPARATUS FOR DYNAMIC CONVERGENCE COILS

[75] Inventors: Jungho Pak, Beaverton; Jaime A. Navia, West Linn, both of Oreg.

[73] Assignee: Tektronix, Inc., Beaverton, Oreg.

[21] Appl. No.: 551,432

[22] Filed: Nov. 14, 1983

[51] Int. Cl.[4] .............................................. H04N 5/645

[52] U.S. Cl. ................................. 358/248; 174/153 G

[58] Field of Search ....................... 358/248; 16/2, 108; 174/152 G, 153 G; 335/213; 445/23

[56] References Cited

U.S. PATENT DOCUMENTS

| | | | |
|---|---|---|---|
| 2.926,210 | 2/1960 | Sturges | 174/153 G |
| 3,243,240 | 3/1966 | Arthur | 174/153 G |
| 4,096,531 | 6/1978 | Yamada et al. | 358/248 |

*Primary Examiner*—Edward L. Coles, Sr.

*Attorney, Agent, or Firm*—Allston L. Jones; Francis I. Gray

[57] ABSTRACT

An apparatus for mounting dynamic convergence coils on the neck of a cathode ray tube monitor. Two mounting boards are provided as a mounting platform for the dynamic convergence coils. The mounting boards are pivotably joined so that they may be opened to provide clearance for installation and then closed to clamp onto the neck of the cathode ray tube. Two elastomeric grommets are positioned between the mounting boards and the neck of the cathode ray tube. When fastened together, the mounting boards compress the grommets against the neck. Suction cups on the grommets grip the neck to prevent movement of the mounting boards, and also deform to allow for dimensional variations of the neck.

12 Claims, 4 Drawing Figures

Fig. 1.
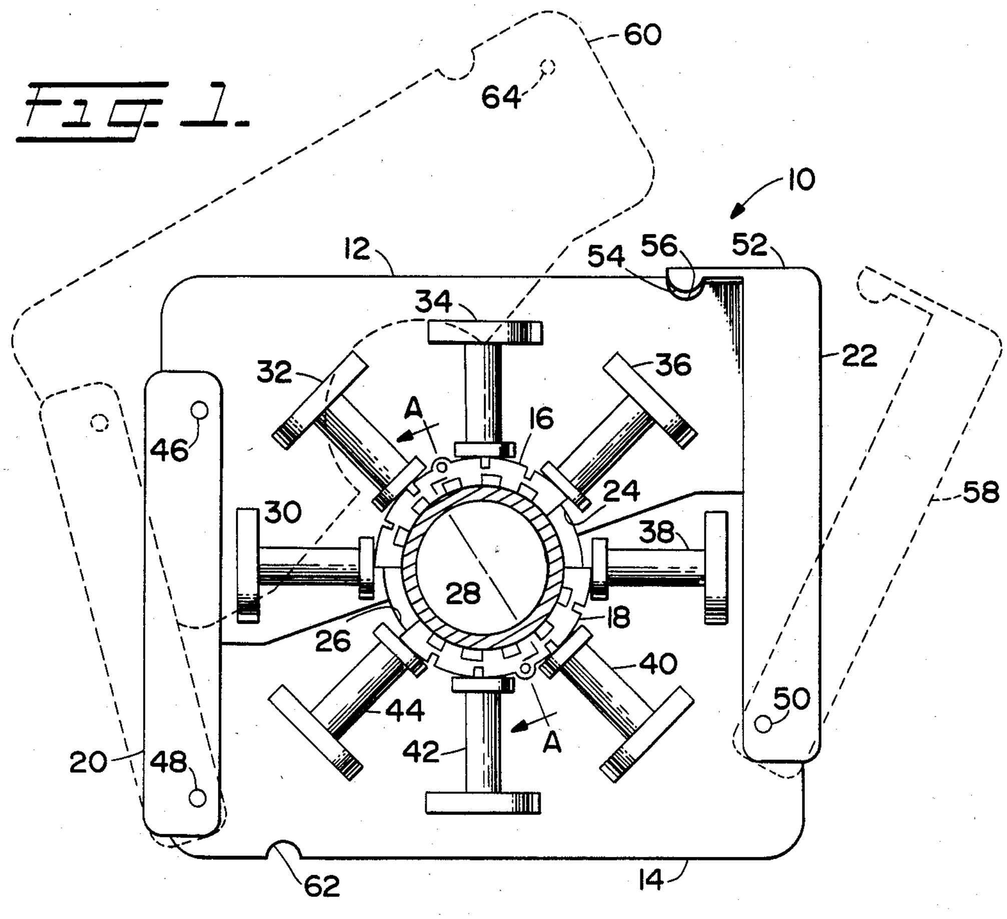
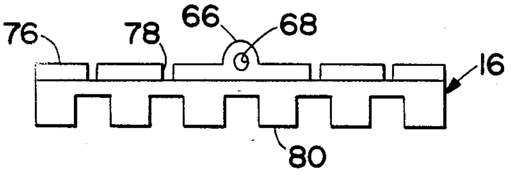
Fig. 2.
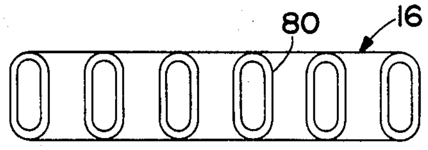
Fig. 3.

MOUNTING APPARATUS FOR DYNAMIC CONVERGENCE COILS

BACKGROUND OF THE INVENTION

1. Field of the Invention

This invention relates generally to cathode ray tube monitors, and relates more particularly to an apparatus for mounting dynamic convergence coils on the neck of a cathode ray tube.

2. Description of the Prior Art

Computer terminals utilize cathode ray tube monitors to display data to the operator. Manufacturers of computer terminals often purchase, rather than build, cathode ray tube monitors. A problem arises when the misconvergence of the electron beams of purchased cathode ray tube monitors is undesirably high. By using add on dynamic convergence coils in addition to the existing static convergence coils, the misconvergence of the cathode ray tube of a preadjusted monitor can be significantly improved. It is desirable to add such dynamic convergence coils to the cathode ray tube of such a monitor without disturbing the position and alignment of the preexisting static coils. In the past, it has been difficult to attach such additional dynamic convergence coils to the cathode ray tube with sufficient rigidity.

SUMMARY OF THE INVENTION

In accordance with the illustrated preferred embodiment, the present invention provides an apparatus for mounting dynamic convergence coils on the neck of a cathode ray tube. Two mounting boards are provided as a mounting platform for the dynamic convergence coils. The mounting boards are pivotably joined so that they may be opened to provide clearance for installation and then closed to clamp onto the neck of the cathode ray tube. Two elastomeric grommets are positioned between the mounting boards and the neck of the cathode ray tube. When fastened together, the mounting boards compress the grommets against the neck. Suction cups on the grommets grip the neck to prevent movement of the mounting boards, and also deform to allow for dimensional variations of the neck.

BRIEF DESCRIPTION OF THE DRAWINGS

FIG. 1 is an end view of a mounting apparatus according to the present invention.

FIG. 2 is a side view of a grommet utilized in the mounting apparatus of FIG. 1.

FIG. 3 is a bottom view of the grommet of FIG. 2 showing several suction cups.

DESCRIPTION OF THE PREFERRED EMBODIMENTS

Figure 4:
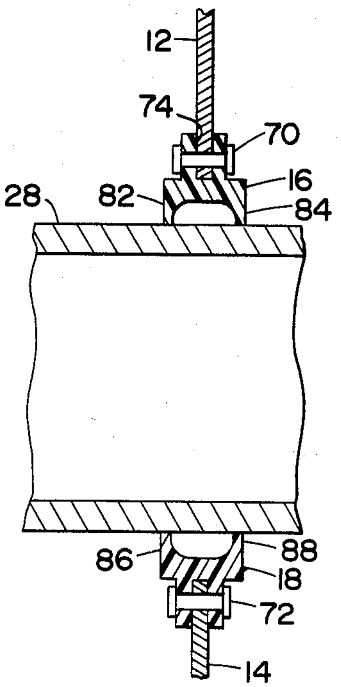
FIG. 4 is a sectional view of a portion of the mounting apparatus of FIG. 1, and is taken along the section lines marked A—A in FIG. 1.

The preferred embodiment of the present invention is a mounting apparatus for attaching dynamic convergence coils to the neck of a cathode ray tube. As shown in FIG. 1, the mounting apparatus 10 includes two mounting boards 12 and 14, two grommets 16 and 18, a pivot bar 20, and a latch bar 22. Mounting boards 12 and 14 are identical to reduce cost and each includes a semi-circular perforation 24 and 26, respectively. Together, semi-circular perforations 24 and 26 form a circular opening that encircles the neck 28 of the cathode ray tube. Four dynamic convergence coils 30, 32, 34, and 36 are fastened to mounting board 12 surrounding the upper half of the neck. An additional four coils 38, 40, 42, and 44 are fastened to mounting board 14 surrounding the lower half of the neck. In the preferred embodiment, the mounting boards are printed circuit boards composed of a glass-resin composite with conductive circuit traces that are electrically connected to the coils.

The mounting apparatus 10 is adapted for installation without removing the deflection yoke or the static convergence coils from the cathode ray tube in an existing monitor. Mounting apparatus 10 simply clamps onto the neck of the cathode ray tube. Pivot bar 20 is pivotably fastened to mounting boards 12 and 14 by fasteners 46 and 48. Latch bar 22 is pivotably fastened at one end to mounting board 14 by fastener 50. A finger 52 projects inwardly from the other end of the latch bar. A tab 54 at the end of finger 52 enters a notch 56 in mounting board 12 to lock the latch bar.

To install the mounting apparatus onto the cathode ray tube, the latch bar is pivoted open and the mounting boards are separated as shown in FIG. 1 in dashed lines at 58 and 60. This provides sufficient clearance to allow mounting board 14 to be positioned with grommet 18 in contact with the neck 28 of the cathode ray tube. Then, mounting board 12 is pivoted to bring grommet 16 into contact with the neck. Finally, the latch bar 22 is closed, thus locking the apparatus in place.

In the preferred embodiment, the two mounting plates 12 and 14 are identical in shape to reduce cost. Accordingly, notch 62 in mounting plate 14 and hole 64 in mounting plate 12 are provided, but are not used.

Grommets 16 and 18 are positioned in the semicircular perforations 24 and 26 of the mounting boards, and act to couple the mounting boards to the neck. When the mounting apparatus 10 is installed, the mounting boards compress the grommets against the neck 28 of the cathode ray tube. The grommets are composed of an elastomeric material, and are preferably composed of polyurethane having a Shore hardness of approximately A70.

FIGS. 2, 3, and 4 illustrate the grommet in greater detail. Grommets 16 and 18 are identical to reduce cost. The grommet includes a central tab 66 with a hole 68 therethrough to permit the grommet to be fastened to its corresponding mounting board by fasteners 70 and 72. The side of the grommet that contacts the mounting board has a groove 74 extending the length of the grommet. The sides 76 of the groove are periodically separated into blocks by several notches 78. This permits the groove to take a convex shape in conformance with the radius of the semicircular perforation.

Several suction cups 80 are positioned on the underside of the grommet. The suction cups permit the grommet to firmly grasp the surface of neck 28 when the mounting boards are clamped in place. There is an interference fit between the surface of neck 28 and the legs 82, 84, 86, and 88 of the suction cups. When the mounting apparatus is clamped onto the neck of the cathode ray tube, the legs of the grommets compress. The resultant contact forces are sufficient to retain the mounting apparatus in position during vibration and movement of the cathode ray tube monitor. In addition, the elastic nature of the grommets compensates for dimensional variations in the radius of the neck due to production tolerances.

In the broadest embodiment, the present invention could include just one grommet for coupling a mounting board to a cylindrical object. In such an embodiment, the mounting board would have a semicircular perforation for mating with the groove of the grommet as does groove 24 of mounting board 12 described above. Means for compressing the suction cups of the grommet against the cylindrical object could be provided, for example, by a tension spring joined at each end to the mounting board and looped around the cylindrical object on the side opposite the grommet. Other variations of this broad embodiment would be suggested to those of ordinary skill in the art.

From the above description, it will be apparent that the invention disclosed herein provides a novel and advantageous apparatus for mounting dynamic convergence coils onto a cathode ray tube monitor. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An apparatus for mounting dynamic convergence coils to the neck of a cathode ray tube, said apparatus comprising:

two mounting boards providing a mounting platform for said dynamic convergence coils, said mounting boards are placed in confronting alignment surrounding said neck;

grommet means composed of an elastomeric material for coupling said mounting boards to said neck; and fastening means coupled to said two mounting boards for joining said mounting boards in confronting alignment.

2. An apparatus as recited in claim 1 wherein said grommet means includes two grommets, where each of said grommets is disposed between one of said mounting boards and said neck, and wherein each of said grommets has a plurality of suction cups disposed for contacting said neck.

3. An apparatus as recited in claim 2 wherein the cross-sectional shape of said neck is substantially circular, wherein each of said two mounting boards defines a semi-circular perforation that provides clearance between said mounting board and said neck, and wherein each of said grommets includes a grooved portion opposite said suction cups for positioning said grommets within said semi-circular perforations.

4. An apparatus as recited in claim 2 wherein said grommets are composed of polyurethane.

5. An apparatus as recited in claim 4 wherein the Shore hardness of said polyurethane is substantially equal at A70.

6. An apparatus as recited in claim 1 wherein said fastening means comprises:

a pivot bar pivotably coupled to both of said mounting boards along one side of said mounting boards; and a latch bar pivotably coupled at one end thereof to the other side of a first of said mounting boards, said latch bar is operable for contacting a second one of said mounting boards to join said mounting boards together.

7. An apparatus as recited in claim 6 wherein said second one of said mounting boards defines a notch in one edge, and wherein said latch bar includes a tab disposed for mating with said notch to join said mounting boards together.

8. An apparatus for mounting dynamic convergence coils to the neck of a cathode ray tube, said apparatus comprising:

two mounting boards providing a mounting platform for said dynamic convergence coils, said mounting boards are placed in confronting alignment surrounding said neck;

two grommets composed of an elastomeric material for coupling said mounting boards to said neck, each of said grommets being disposed between one of said mounting boards and said neck, each of said grommets having a plurality of suction cups disposed for contacting said neck; and fastening means coupled to said two mounting boards for radially compressing said grommet means against said neck when said mounting boards are joined together.

9. An apparatus for perpendicular attachment to a cylindrical object, said apparatus comprising:

a mounting board placed adjacent said cylindrical object;

a grommet composed of an elastomeric material for coupling said mounting board to said cylindrical object, said grommet being disposed between said mounting board and said cylindrical object, said grommet having a plurality of suction cups disposed for contacting said cylindrical object, and also having a grooved portion disposed for contacting said mounting board; and means coupled to said mounting board for urging said mounting board toward said cylindrical object thereby compressing said grommet means.

10. An apparatus for perpendicular attachment of a planar object to a cylindrical object, said apparatus comprising:

a grommet disposed between said planar and cylindrical objects, said grommet being composed of an elastomeric material, said grommet having a plurality of suction cups disposed on one side for contacting said cylindrical object, and also having a grooved portion disposed on the opposite side for contacting said planar object.

11. An apparatus as recited in claim 10 wherein said grommet is composed of polyurethane.

12. An apparatus as recited in claim 11 wherein the Shore hardness of said polyurethane is substantially equal to A70.

* * * * *